United States Patent
Scott et al.

(10) Patent No.: US 9,311,002 B1
(45) Date of Patent: Apr. 12, 2016

(54) SYSTEMS, METHODS, AND COMPUTER READABLE MEDIA FOR COMPRESSING DATA AT A VIRTUALLY PROVISIONED STORAGE ENTITY

(75) Inventors: Derek Scott, Morrisville, NC (US); Karl M. Owen, Chapel Hill, NC (US); Chung-Huy Chen, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 727 days.

(21) Appl. No.: 12/826,385

(22) Filed: Jun. 29, 2010

(51) Int. Cl.
G06F 3/06 (2006.01)
(52) U.S. Cl.
CPC ............ G06F 3/0608 (2013.01); G06F 3/0665 (2013.01); G06F 3/0689 (2013.01)
(58) Field of Classification Search
CPC ... G06F 3/0608; G06F 3/0665; G06F 3/0689; G06F 17/30153
USPC ................. 710/68; 709/247; 711/173; 210/68
See application file for complete search history.

(56) References Cited

U.S. PATENT DOCUMENTS

| | | |
|---|---|---|
| 5,140,592 A | 8/1992 | Idleman et al. |
| 5,459,850 A | 10/1995 | Clay et al. |
| 5,604,902 A | 2/1997 | Burkes et al. |
| 6,192,432 B1 | 2/2001 | Slivka et al. |
| 6,310,563 B1 | 10/2001 | Har et al. |
| 6,360,300 B1 * | 3/2002 | Corcoran et al. ............. 711/139 |
| 6,442,659 B1 | 8/2002 | Blumenau |
| 6,681,242 B1 | 1/2004 | Kumar et al. |
| 6,880,062 B1 | 4/2005 | Ibrahim et al. |
| 7,284,244 B1 | 10/2007 | Sankaranarayan et al. |
| 7,340,522 B1 | 3/2008 | Basu et al. |
| 7,406,484 B1 | 7/2008 | Srinivasan et al. |
| 7,463,648 B1 | 12/2008 | Eppstein et al. |
| 7,480,912 B2 | 1/2009 | Arnold et al. |

(Continued)

OTHER PUBLICATIONS

Lacroix, R., EMC Introduces New EMC CLARiiON CX4 Series with Next Generation Architecture, Aug. 5, 2008 (Retrieved Dec. 18, 2014 from http://www.emc.com/about/news/press/2008/20080805-01.htm), EMC, 5 pages.*

(Continued)

*Primary Examiner* — Gary W Cygiel
(74) *Attorney, Agent, or Firm* — Jenkins, Wilson, Taylor & Hunt, P.A.

(57) ABSTRACT

Systems, methods, and computer readable media for accessing and compressing data at a virtually provisioned storage entity are disclosed. According to one aspect, a method includes receiving, at a data storage entity, an input/output (I/O) command to perform an operation on data associated with a logical block address (LBA) in a virtually provisioned device in the data storage entity, wherein the data storage entity has established an expanded private LBA space for the virtually provisioned device in the data storage entity to include both a compressed LBA space portion for storing compressed data and an associated uncompressed LBA space portion for storing uncompressed data. The method further includes determining if a data chunk containing the data in the uncompressed LBA space is available using the LBA in the I/O command to access the data chunk. If the data chunk in the uncompressed LBA space is available, the method includes performing the operation on the data chunk. If the data chunk in the uncompressed LBA space is not available, the method includes accessing the data chunk in the compressed LBA space using both the LBA and a predefined offset value and performing the operation on the data chunk.

24 Claims, 6 Drawing Sheets

(56) References Cited

U.S. PATENT DOCUMENTS

| | | | |
|---|---|---|---|
| 7,577,692 | B1 | 8/2009 | Corbett et al. |
| 7,702,873 | B2 | 4/2010 | Griess et al. |
| 7,814,128 | B2 | 10/2010 | Silvers et al. |
| 7,849,180 | B2 | 12/2010 | Sawyer et al. |
| 8,140,821 | B1 * | 3/2012 | Raizen et al. ............ 711/202 |
| 8,191,125 | B2 | 5/2012 | Dellow et al. |
| 8,359,444 | B2 | 1/2013 | Arakawa |
| 8,392,382 | B2 | 3/2013 | Marwah et al. |
| 8,407,445 | B1 | 3/2013 | Pathak et al. |
| 8,443,163 | B1 | 5/2013 | Bailey et al. |
| 8,443,369 | B1 | 5/2013 | Bailey et al. |
| 8,473,678 | B1 | 6/2013 | Rajasekaran et al. |
| 8,745,327 | B1 | 6/2014 | Throop et al. |
| 8,886,909 | B1 | 11/2014 | De Forest et al. |
| 8,924,681 | B1 | 12/2014 | Throop et al. |
| 2001/0049779 | A1 | 12/2001 | Shimada et al. |
| 2003/0056073 | A1 | 3/2003 | Zeiger |
| 2003/0131165 | A1 | 7/2003 | Asano et al. |
| 2004/0039891 | A1 | 2/2004 | Leung et al. |
| 2004/0054850 | A1 | 3/2004 | Fisk |
| 2004/0098537 | A1 | 5/2004 | Serizawa |
| 2004/0153606 | A1 | 8/2004 | Schott |
| 2004/0181476 | A1 | 9/2004 | Smith et al. |
| 2004/0243699 | A1 | 12/2004 | Koclanes et al. |
| 2005/0193231 | A1 | 9/2005 | Scheuren |
| 2005/0273556 | A1 | 12/2005 | Gellai et al. |
| 2006/0010290 | A1 | 1/2006 | Sasamoto |
| 2006/0085471 | A1 | 4/2006 | Rajan et al. |
| 2006/0112247 | A1 | 5/2006 | Ramany et al. |
| 2006/0143424 | A1 | 6/2006 | Matsuzaki et al. |
| 2007/0005625 | A1 | 1/2007 | Lekatsas et al. |
| 2007/0043842 | A1 | 2/2007 | Chouanard et al. |
| 2007/0143563 | A1 | 6/2007 | Pudipeddi et al. |
| 2007/0150690 | A1 * | 6/2007 | Chen et al. ............ 711/170 |
| 2007/0185934 | A1 | 8/2007 | Cannon et al. |
| 2008/0066069 | A1 | 3/2008 | Verbowski et al. |
| 2008/0082593 | A1 | 4/2008 | Komarov et al. |
| 2009/0034107 | A1 | 2/2009 | Posamentier |
| 2009/0064159 | A1 | 3/2009 | LaFrese et al. |
| 2009/0077327 | A1 | 3/2009 | Hara |
| 2009/0089516 | A1 | 4/2009 | Pelts et al. |
| 2009/0106281 | A1 | 4/2009 | Marwah et al. |
| 2009/0248763 | A1 | 10/2009 | Rajan et al. |
| 2009/0276588 | A1 | 11/2009 | Murase |
| 2009/0292870 | A1 | 11/2009 | Sambe et al. |
| 2009/0307424 | A1 | 12/2009 | Galloway et al. |
| 2010/0153641 | A1 | 6/2010 | Jagadish et al. |
| 2010/0262802 | A1 | 10/2010 | Goebel et al. |
| 2010/0299495 | A1 | 11/2010 | Frank |
| 2011/0145609 | A1 | 6/2011 | Berard et al. |
| 2011/0191536 | A1 | 8/2011 | Mizuno et al. |

OTHER PUBLICATIONS

Official Action for U.S. Appl. No. 12/164,959 (Sep. 12, 2011).
Commonly Assigned, Co-pending U.S. Appl. No. 13/168,329 for "Methods, Systems, and Computer Readable Medium for Controlling Prioritization of Tiering and Spin Down Features in a Data Storage System" (Unpublished, filed Jun. 24, 2011).
Final Official Action for U.S. Appl. No. 12/100,514 (May 25, 2011).
Non-Final Official Action for U.S. Appl. No. 12/100,514 (Nov. 16, 2010).
Commonly-assigned, Co-pending U.S. Appl. No. 12/826,434 for "Managing Multi-Tiered Storage Pool Provisioning," (Unpublished, filed Jun. 29, 2010).
Commonly Assigned, Co-pending U.S. Appl. No. 12/824,816 for "Methods, Systems, and Computer Readable Medium for Tier-Based Data Storage Resource Allocation and Data Relocation in a Data Storage Array" (Unpublished, filed Jun. 28, 2010).
Commonly Assigned, Co-pending U.S. Appl. No. 12/751,685 for "Systems, Methods, and Computer Readable Media for an Adaptative Block Allocation Mechanism" (Unpublished, filed Mar. 31, 2010).
Commonly Assigned, Co-pending U.S. Appl. No. 12/164,959 for "Methods, Systems, and Computer Readable Medium for Dynamic, Policy-Based Allocation of System Resources" (Unpublished, filed Jun. 30, 2008).
Commonly Assigned, Co-pending U.S. Appl. No. 12/100,514 for "Methods, Systems, and Computer Readable Medium for Allocating Physical Storage in a Storage Array" (Unpublished, filed Apr. 10, 2008).
Final Official Action for U.S. Appl. No. 12/751,685 (Jun. 27, 2012).
Applicant-Initiated Interview Summary for U.S. Appl. No. 12/100,514 (Jun. 5, 2012).
Non-Final Official Action for U.S. Appl. No. 12/751,665 (May 8, 2012).
Non-Final Official Action for U.S. Appl. No. 12/751,685 (Feb. 14, 2012).
Non-Final Official Action for U.S. Appl. No. 12/100,514 (Jan. 31, 2012).
Notice of Allowance and Fee(s) Due for U.S. Appl. No. 12/751,665, (Nov. 16, 2012).
Non-Final Office Action for U.S. Appl. No. 12/824,816 (Sep. 14, 2012).
Interview Summary for U.S. Appl. No. 12/751,665 (Aug. 20, 2012).
Final Official Action for U.S. Appl. No. 12/100,514 (Aug. 10, 2012).
Non-Final Official Action for U.S. Appl. No. 12/164,959 (Jul. 24, 2012).
Non-Final Official Action for U.S. Appl. No. 12/826,434 (Jun. 13, 2012).
Notice of Allowance and Fee(s) Due for U.S. Appl. No. 12/826,434 (Mar. 7, 2013).
Notice of Allowance and Fee(s) Due for U.S. Appl. No. 12/824,816 (Jan. 17, 2013).
Notice of Allowance and Fee(s) Due for U.S. Appl. No. 12/164,959 (Jan. 11, 2013).
Applicant-Initiated Interview Summary for U.S. Appl. No. 12/822,173 (Oct. 18, 2013).
Non-Final Office Action for U.S. Appl. No. 12/100,514 (Oct. 15, 2013).
Non-Final Office Action for U.S. Appl. No. 13/168,329 (Oct. 7, 2013).
Final Office Action for U.S. Appl. No. 12/822,173 (Jun. 12, 2013).
Non-Final Office Action for U.S. Appl. No. 12/822,173 (Mar. 26, 2012).
McGaughey, Katryn, "New Levels of EMC Midrange Storage Efficiency and Simplicity Accelerate Journey to the Private Cloud," EMC Press Release, pp. 1-4, http://www.emc.com/about/news/press/2010/20100511-02.htm, (May 11, 2010).
Sakac, Chad, "EMC Unified Storage—Next Generation Efficiency Details", Virtual Geek blog, pp. 1-15, http://virtualgeek.typepad.com/virtual_geek/2010/05/emc-unified-storage-next-generation-efficiency-details.html, (May 11, 2010).
Non-Final Office Action for U.S. Appl. No. 12/822,173 (Jan. 29, 2015).
Notice of Allowance and Fee(s) Due for U.S. Appl. No. 12/751,685 (Aug. 25, 2014).
Final Office Action for U.S. Appl. No. 12/822,173 (Aug. 5, 2014).
Notice of Allowance and Fee(s) Due for U.S. Appl. No. 12/100,514 (Jul. 2, 2014).
Non-Final Office Action for U.S. Appl. No. 12/751,685 (Apr. 10, 2014).
Final Office Action for U.S. Appl. No. 12/100,514 (Feb. 6, 2014).
Non-Final Office Action for U.S. Appl. No. 12/822,173 (Jan. 30, 2014).
Notice of Allowance and Fee(s) Due for U.S. Appl. No. 13/168,329 (Jan. 27, 2014).

* cited by examiner

SYSTEMS, METHODS, AND COMPUTER READABLE MEDIA FOR COMPRESSING DATA AT A VIRTUALLY PROVISIONED STORAGE ENTITY

TECHNICAL FIELD

The subject matter described herein relates to methods and systems for managing data in data storage devices. More particularly, the subject matter described herein relates to systems, methods, and computer readable media for compressing data at a virtually provisioned storage entity.

BACKGROUND

Data storage array systems are presently being utilized by corporate and business entities as a means for storing significant amounts of business related data. As the number of companies that utilize data storage array systems continue to increase, so does the amount of storage space these data storage array systems must be equipped to provide. Similarly, the data storage array systems may also employ different techniques that optimizes their current data storage capabilities. For example, a data storage array may employ various compression techniques to reduce the size of data stored in the storage arrays. However, although several companies use data storage arrays to store data, these companies also frequently access (i.e., read or write) the compressed data on a regular basis. Notably, the compressed data must be decompressed in some manner before it can be read or written. However, the frequent compression and decompression of data can create problems pertaining to the permanent loss of data. For example, should the system experience some type of failure while a piece of compressed data is partially overwritten, it is possible that some data may become unrecoverable.

Accordingly, in light of these disadvantages associated with conventional methods for compression of data stored within a data storage device, there exists a need for systems, methods, and computer-readable media for compressing data at a virtually provisioned storage entity to a data storage entity.

SUMMARY

According to one aspect, the subject matter described herein includes receiving, at a data storage entity, an input/output (I/O) command to perform an operation on data associated with a logical block address (LBA) in a virtually provisioned device in the data storage entity, wherein the data storage entity has established an expanded private LBA space for the virtually provisioned device in the data storage entity to include both a compressed LBA space portion for storing compressed data and an associated uncompressed LBA space portion for storing uncompressed data. The method further includes determining if a data chunk containing the data in the uncompressed LBA space is available using the LBA in the I/O command to access the data chunk. If the data chunk in the uncompressed LBA space is available, the method includes performing the operation on the data chunk. If the data chunk in the uncompressed LBA space is not available, the method includes accessing the data chunk in the compressed LBA space using both the LBA and a predefined offset value and performing the operation on the data chunk.

The subject matter described herein for the access and compression of data in a data storage entity may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for compressing data at a virtually provisioned storage entity. When writing data to a compressed logical unit, or modifying data within the compressed logical unit, data is not written to the logical unit in compressed form, but is instead written to the logical unit in uncompressed form, and subsequently compressed. Rather than a file-based compression domain, block-based compression domains are used. Rather than defining the compression domain to be the size of the entire logical unit, a single logical unit may include multiple compression domains.

Reference will now be made in detail to exemplary embodiments of the present subject matter, examples of which are illustrated in the accompanying drawings. Wherever possible, the same reference numbers will be used throughout the drawings to refer to the same or like parts.

Figure 1:
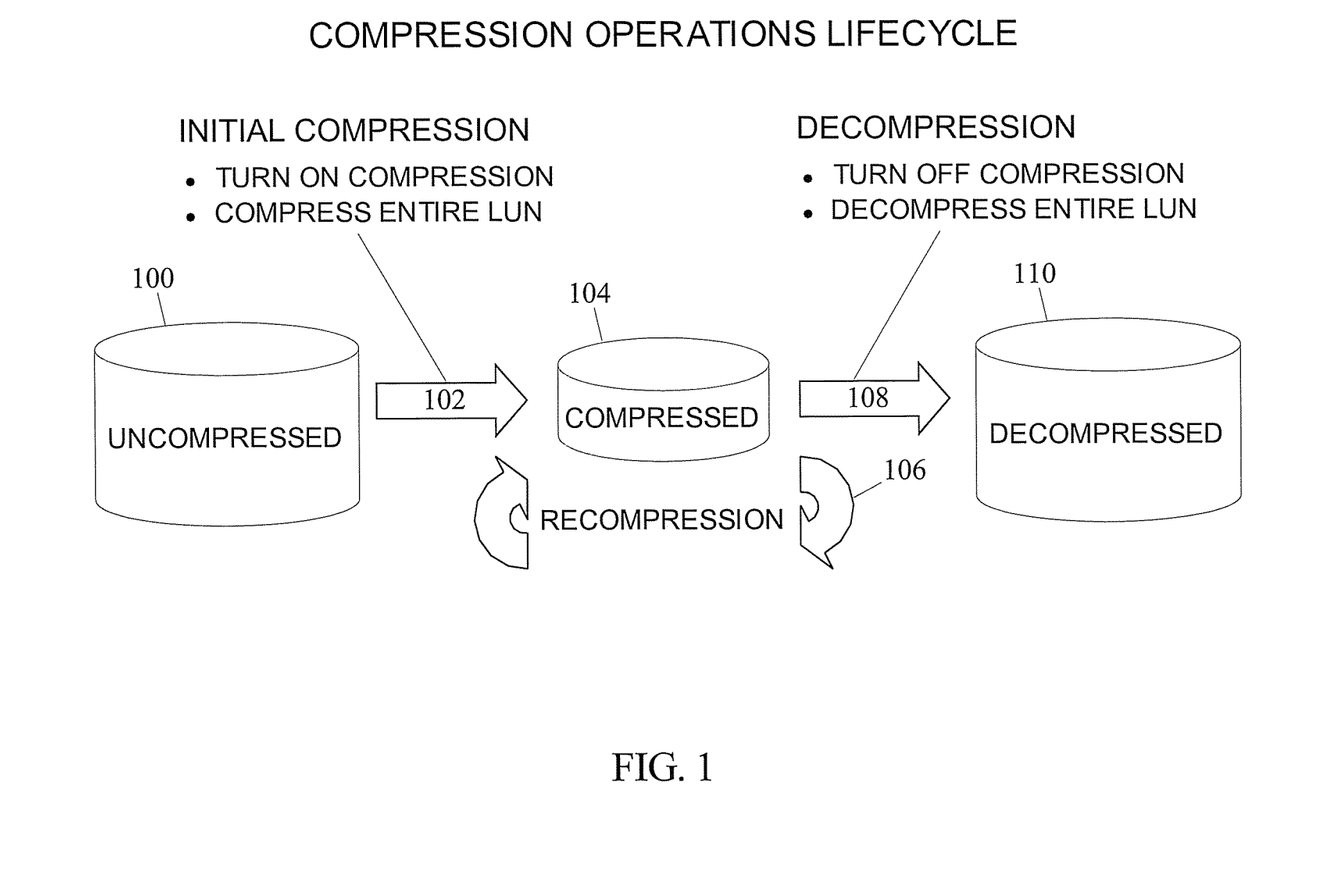
FIG. 1 is a block diagram illustrating a compression operations lifecycle according to an embodiment of the subject matter described herein.

FIG. 1 is a block diagram illustrating a compression operations lifecycle according to an embodiment of the subject matter described herein. In FIG. 1, a volume of data storage, such as a logical unit (LU) or virtual storage device (VPD), may begin in an uncompressed state 100. This means that any data initially contained within the volume is not compressed.

Upon initiation of an initial compression 102, compression for the volume is turned on, meaning that all incoming data is at least potentially subject to compression. If the volume already contains uncompressed data, the data on that volume is compressed. The result of initial compression 102 is the creation of a volume in a compressed state 104. This volume may be subject to recompression 106 in response to the detection of certain triggers, such as the detection of a threshold condition. The volume in compressed state 104 may be decompressed and recompressed multiple times. In one embodiment, data storage systems may implement a compression technique where recompression step 106 may be deferred, perhaps indefinitely.

Upon initiation of a decompression 108, such as if the volume type is changed to uncompressed type or if the volume is otherwise converted to an uncompressed volume, compression is turned off for incoming data, and any data currently existing within the volume is decompressed. As a result of decompression 108, the volume is decompressed 110, e.g., the volume returns to an uncompressed state.

When data that exists on the compressed logical unit is modified, the system determines whether the data to be modified exists on the logical unit as compressed or uncompressed data. If the data to be modified exists on the logical unit as compressed data, the system may uncompress the data, modify the uncompressed data, and write the modified data back to the logical unit. Namely, instead of writing the data back to the logical unit in compressed form, the system of the present subject matter may, in one embodiment, write the data back to the logical unit in uncompressed form.

In one embodiment, if an entire chunk of compressed data is overwritten, however, the compressed data is not decompressed. Instead, the new data may be written to the logical unit, either overwriting compressed data currently stored within the chunk with new, uncompressed data, or alternatively, writing the uncompressed data to one or more new mapping units, mapping the new mapping units into the mapped logical unit (MLU) logical address space, and deallocating the mapping units that were formerly mapped to that same MLU logical address space so that the mapping units may be used to store something else. This avoids any need to perform a decompression and thus saves time and resources. In one embodiment, a mapping unit may represent 8 KB of data.

Figure 2:
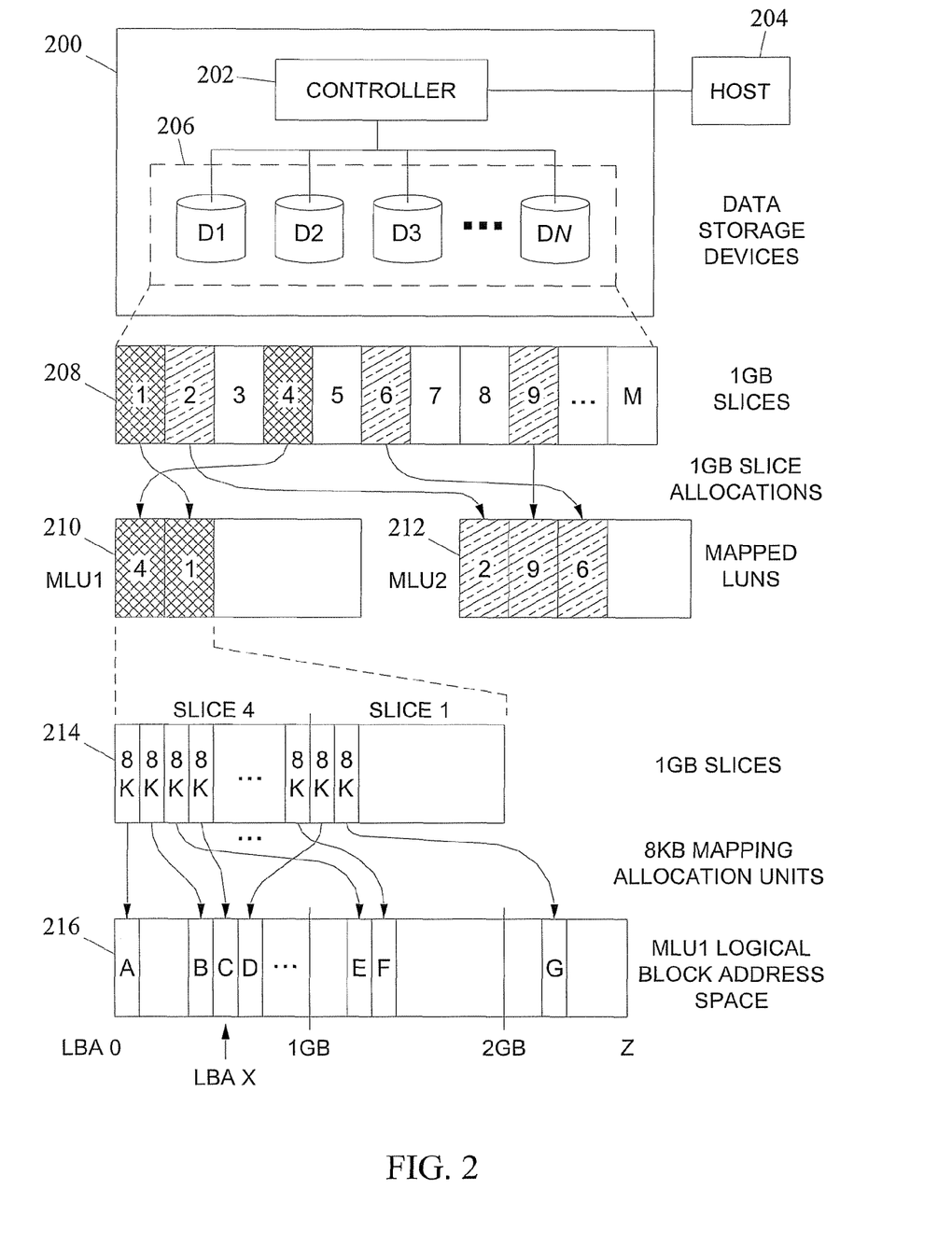
FIG. 2 is block diagram illustrating an exemplary system for compressing data incoming to a virtually provisioned storage entity according to an embodiment of the subject matter described herein.

FIG. 2 is block diagram illustrating an exemplary system for compressing data incoming to a data storage entity according to an embodiment of the subject matter described herein. Data storage system 200 includes a controller 202 for communicating with one or more hosts 204 to read and write data to one or more data storage devices 206, whose collective data storage capacity is represented as data storage area 208. In the embodiment illustrated in FIG. 2, data storage system 200 has N number of data storage devices, labeled D1 through DN. Data storage devices 206 may include hard disk drives, floppy disk drives, tape drives, FLASH drives, or any other form of persistent storage. In one embodiment, data storage devices 206 may be organized into redundant arrays of inexpensive disks (RAID) groups.

In one embodiment, the total data storage area 208 may be divided into slices for allocation to one or more logical units, or virtual storage devices. In the embodiment illustrated in FIG. 2, data storage area 208 is divided into M number of one gigabyte (1 GB) slices. In one embodiment, the pool of data storage devices 206 are first divided into RAID groups, which are themselves divided into several logical units each. The 1 GB slices may be provisioned from those logical units.

In one embodiment, data storage system 200 supports sparsely allocated logical units, also called thinly allocated logical units (TLUs), in which slices are allocated to the logical unit as needed, in contrast to fully allocated logical units, in which all of the slices that the logical unit will ever need based on its projected maximum size are allocated to the logical unit at the time its creation. In the embodiment illustrated in FIG. 2, data storage system 200 supports mapped logical units, or MLUs, in which the slices that are allocated to the TLU are not necessarily contiguous within the collective data storage area. For example, mapped MLU1 210 has been allocated two slices (i.e., slice 4 and slice 1) from data storage area 208. MLU2 212 has been allocated three slices (i.e., slice 2, slice 9, and slice 6) from data storage area 208.

In one embodiment, each slice may be further subdivided into portions that are allocated and mapped to the MLU as needed. These portions of a slice are herein referred to as "mapping allocation units". In the embodiment illustrated in FIG. 2, mapping allocation units are 8 KB in size, but any other size may be used without departing from the scope of the present subject matter. In this scenario, slices are said to be provisioned to an MLU and thereby made available for use. Likewise, the 8 KB portions of the slice are said to be allocated to specific ranges of logical block addresses within the MLU as data space is being used. In the embodiment illustrated in FIG. 2, the data storage area represented by slices 4 and 1 are represented as container 214, which is a data structure that allows the MLU to be presented as a data storage area having a logical block address space larger than the physical space that is actually present. Container 214 maps the 8 KB mapping allocation units into the logical block address space of MLU1 210, which is represented as element 216 in FIG. 2. Note that the 8K mapping allocation units need not be mapped into contiguous logical block address spaces, and that the 8K mapping allocation units may be allocated from any 1 GB slice. For example, in the embodiment illustrated in FIG. 2, 8 KB mapping allocation units B, C, and D occupy contiguous portions of the logical block address space of MLU1 210, but do not occupy contiguous portions of slice 4 or slice 1. Moreover, mapping allocation units B and C are allocated from slice 4 while mapping allocation unit D is allocated from slice 1.

In one embodiment, logical block address space 216 is divided into compression domains, called "chunks". As stated above, the size of a chunk should be chosen as a compromise between compression efficiency (which increases with increasing chunk size) and system performance (which decreases with increasing chunk size). In one embodiment, illustrated in FIG. 3, a chunk size of 64 KB is selected.

In one embodiment, the first half of the LU's logical block address space may be used to hold uncompressed data (i.e., uncompressed region) while the second half will hold compressed data (i.e., compressed region). For example, the transformation from uncompressed-region LBA to compressed-region LBA can be achieved by applying a bitwise OR operation to the most significant bit (MSB) of the LU's uncompressed region LBA to create a new compressed-region LBA that is associated with the original uncompressed region.

When servicing I/O to a chunk, a compression coordinator, which is discussed in detail below with respect to FIG. 4, may first check for the existence of uncompressed data. If the uncompressed-region for the chunk is allocated, data may be read/written directly to the uncompressed-region. Conversely, if the entire uncompressed-region is unallocated, the compression coordinator may check for data in the compressed-region. Also, if there is a valid allocation in the compressed-region, the data must be decompressed and returned or modified as appropriate. If neither region contains a valid allocation, then the entire chunk is unallocated.

Compressing a chunk does not modify the data within the chunk. When data that has been previously compressed is overwritten, the chunk is decompressed and the new data is written to the uncompressed-region. Therefore, the data in the uncompressed-region is always at least as correct as the data in the compressed-region.

Figure 3:
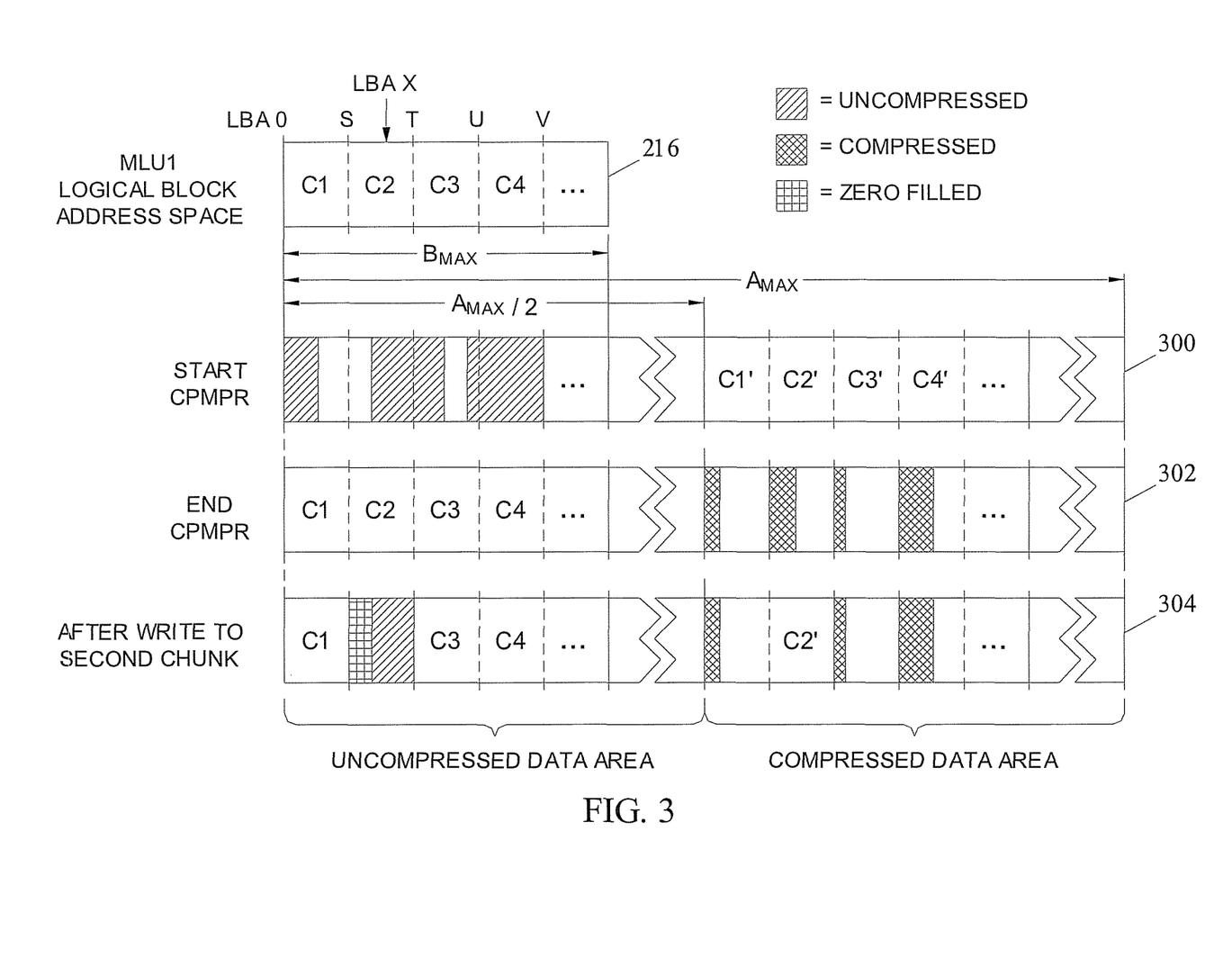
FIG. 3 illustrates an exemplary logical unit that has been divided into compression domains (e.g., chunks) according to an embodiment of the subject matter described herein.

FIG. 3 illustrates an exemplary use of existing data storage system constructs for compressing data at a virtually provisioned storage entity according to an embodiment of the subject matter described herein. FIG. 3 illustrates an exemplary logical block address space of an LU that has been divided into compression domains, called chunks, according to an embodiment of the subject matter described herein. In FIG. 3, the storage space of MLU1 210 is shown as presented to a host, i.e., as logical block address space 216, which has logical block addresses ranging from LBA 0 through LBA V (and beyond). Logical block address space 216 is divided into multiple 64 KB chunks, labeled C1 through C4 (and beyond). Logical block addresses S, T, U, and V represent address boundaries between the 64 KB blocks. Each of chunks C1-C4 is treated as an independent compression domain.

In the embodiment illustrated in FIG. 3, logical block address space 216 has been defined as having a maximum size of $B_{MAX}$ logical blocks, where $B_{MAX}$ is a function of the maximum size of a sparsely allocated MLU. However, the logical address space used by data storage system 200 has a maximum number of logical blocks $A_{MAX}$, where ($A_{MAX}$>$B_{MAX}$). In the embodiment illustrated in FIG. 3, the maximum logical block address space supported by the logical address space is divided into two parts, each part being ($A_{MAX}/2$) logical block addresses in size. The first half of the logical block address space, i.e., from logical block address 0 to logical block address ($A_{MAX}/2$), is used for storing uncompressed data. This region is called the uncompressed region (UR). All data stored in an LU is initially placed in the uncompressed region. The second half of the logical block address space, i.e., from logical block address $A_{MAX}/2$ to logical block address $A_{MAX}$, is used for storing compressed data. This region is called the compressed region (CR). The logical space for a TLU is expanded in the mapping system (MS), which is discussed in detail below with respect to FIG. 4, while keeping the TLU the same size. This operation consumes no real storage but creates an expanded private (i.e., not available to the host) logical block address space. Specifically, since a TLU only needs enough LBA space for a maximum size TLU, a CR and UR for each chunk may be created in the largest possible TLU. In one embodiment, the maximum size of a TLU may be 14 TB to 16 TB.

In one embodiment, each chunk associated with a TLU or MLU is mapped to both a portion of the uncompressed region and a corresponding portion of the compressed region. In the embodiment illustrated in FIG. 3, chunks C1-C4 are mapped to like-named portions of the uncompressed region and are also mapped to corresponding portions of the compressed region. For example, uncompressed data stored within chunk C1 is mapped to the mapping system logical block addresses starting from logical block address 0. If the data stored within chunk C1 is compressed, the compressed data is physically stored in some other chunk within LBA 216, e.g., chunk C1'. From the viewpoint of the data storage system, however, chunk C1' is algorithmically mapped to a logical address space that corresponds to the logical address space of C1, but within the portion of the address space that is used for storing compressed data. In the embodiment illustrated in FIG. 3, for example, chunk C1 resides a logical block address 0, and chunk C1' resides a logical block address $0+A_{MAX}/2$. Likewise, chunk C2 starts a logical block address J and chunk C2' starts at logical block address $S+A_{MAX}/2$. In this manner, the data storage system maps uncompressed data to logical block address X and maps the corresponding compressed data to logical block address $X+A_{MAX}/2$.

Although additional logical block address space is provided, no real storage space is consumed for the additional logical block addresses. The logical space is created by keeping the TLU the same size while extending the logical address space of the TLU to its maximum possible size. Namely, this operation does not consume any real storage as the created logical block address space is virtual. Since the TLU only requires enough logical block address space for a maximum sized TLU, the logical unit may be expanded to at least twice its logical size in order to create a compression region (CR) and an uncompressed region (UR) for each chunk in the largest possible TLU.

FIG. 3 further illustrates three snapshots of the contents of a logical block address space that is utilized according to an embodiment of the subject matter described herein. Snapshot 300 shows the contents of the logical block address space before compression. In this snapshot, each of chunks C1 through C4 contains uncompressed data. The corresponding chunks C1' through C4' do not yet contain any data. Snapshot 302 shows the contents of the mapping system after compression. The data that formerly occupied chunk C1 has been compressed and is now stored in chunk C1'. The same is true for each of chunks C2, C3, and C4 since their data has been compressed and is respectively stored in chunks C2', C3', and C4'. Once the data has been compressed and successfully stored into the compressed data area, the original uncompressed data may be deleted from the uncompressed data area, (i.e., chunks C1-C4 are cleared). Because the results of the compression do not overwrite the uncompressed data, and vice versa, a system failure during the compression or decompression step will not cause a loss of data. This feature provides greater stability and allows for data recovery in the event of a failure.

Snapshot 304 shows the contents of the mapping system after data has been written to the second chunk, C2. A write to a logical block address within C2 triggers data storage system 200 to determine whether that chunk is currently compressed or not. In the example illustrated in FIG. 3, chunk C2 has been compressed and the compressed data is currently stored in chunk C2'. The data within chunk C2' is then decompressed and stored into chunk C2, after which the data write can proceed. Once the write is finished, however, the system does not necessarily recompress the data within chunk C2 and store it into chunk C2'. Instead, this recompression will occur only when and if needed.

Figure 4:
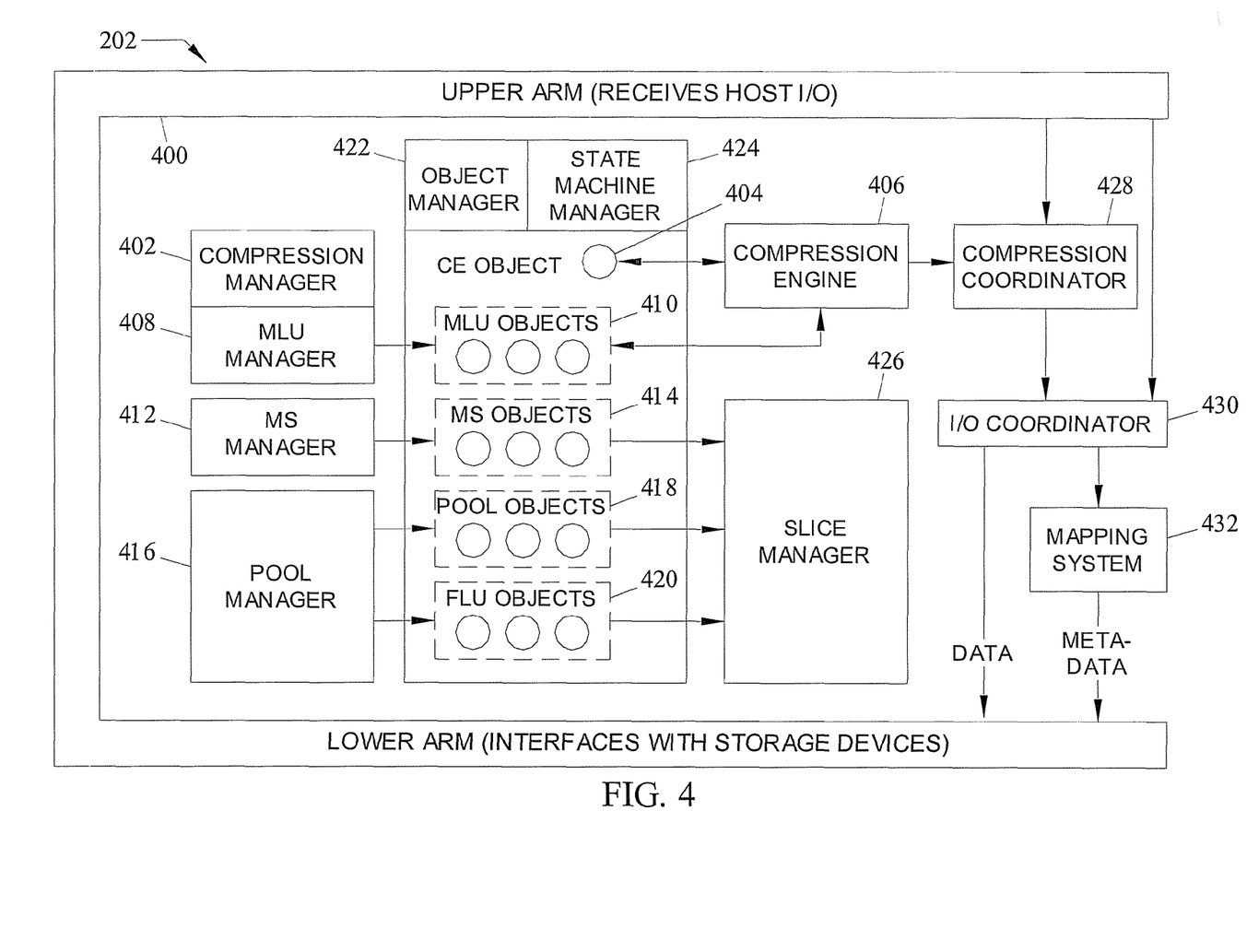
FIG. 4 is a block diagram illustrating an exemplary controller for compressing data received at a virtually provisioned storage entity according to another embodiment of the subject matter described herein.

FIG. 4 is a block diagram illustrating a controller for implementing an exemplary system for compressing data incoming to a data storage entity according to another embodiment of the subject matter described herein. In the embodiment illustrated in FIG. 4, controller 202 from FIG. 2 is shown in more detail. Controller 202 includes an interface 400 for receiving I/O requests from a host and for controlling the storage devices within the system. Because interface 400 is often in a shape that resembles a physical C-shaped clamp, interface 400 is colloquially referred to as "the C-clamp" having an "upper arm" that handles communication to and from the hosts and a "lower arm" that handles communication to and from the hard disk drives or other storage devices.

In the embodiment illustrated in FIG. 4, controller 202 includes a compression manager 402, which is a collection of interface routines to assist other components in interacting with data that is stored in various data constructs, called "objects", which are used by controller 202. Controller 202 also includes a compression engine (CE) object 404, which is an object representing the compression engine 406. CE object 404 is used to store global data relevant to compression, such as the global pause/resume and compression/decompression/recompression state.

In one embodiment, compression engine 406 is configured to determine when to compress, decompress, or recompress LU chunks and makes requests to a compression coordinator 428 to perform the actual compression or decompression process. Namely, compression coordinator 428 is responsible for reading data, compressing and decompressing data, writing data to compressed data and decompressed data, and deallocating redundant uncompressed data and compressed data. In one embodiment, compression engine 406 operates in response to the write operations of compression coordinator 428 (e.g., since the writing of uncompressed data instead of compressed data causes storage demands to increase). Compression engine 406 acts in response to that increase, which it measures by requesting information from the mapping system through a LU (e.g., a MLU).

In one embodiment, when the compression process is executed for a given TLU, compression engine 406 begins issuing commands to compression coordinator 428 to instruct it to begin reading the TLU's data in chunks (e.g., 64 KB sized data chunks), compress the data for each chunk, and write the compressed data to the compressed-region corresponding to that chunk of the TLU. After the compressed data has been written, compression coordinator 428 may deallocate the original chunk of uncompressed data.

Controller 202 includes a mapped logical unit (MLU) manager 408 for managing MLU objects 410, a mapping system (MS) manager 412 for managing MS objects 414, a pool manager 416 for managing pool objects 418 and RAID based logical unit objects (also known as "Flare" logical units, or FLUs) objects 420. An object manager 422 and state machine manager 424 are used to track and maintain the various objects (MLU, MS, pool, and FLU objects, for example) used by controller 202. A slice manager 426 is responsible for allocation of slices to logical units. In one embodiment, MLU manager 408 handles the control path and provides support for the logic in the I/O path by providing access to control path data.

Compression coordinator 428 processes host I/O requests that are received by the upper arm of C-clamp 400 and passed to compression coordinator 428, if compression is turned on, or to I/O coordinator 430, if compression is turned off. To service host I/O requests, compression coordinator 428, which is a component in the I/O path, will locate the appropriate chunk(s), decompress the data for them if necessary, and for write I/O requests, write the correct output. In one embodiment, writes to a compressed chunk results in the entire chunk being read, decompressed and rewritten, with the written data placed appropriately among the decompressed data. When the process is complete, the compression coordinator 428 deallocates the old compressed data. This avoids placing a compression step in the I/O path, but results in the LU becoming less compressed over time. In response, compression engine 406 may be configured to periodically recompress the LU.

If compression is turned on, I/O coordinator 430 is configured to receive and execute sub-I/O commands issued by compression coordinator 428. As used herein, a sub-I/O command is functionally the same as a regular I/O command except that is provided by the compression coordinator 428 as part of the actions the compression coordinator 428 takes to service a host I/O request. In one embodiment. I/O coordinator 430 is also configured to send write data to the lower arm of C-clamp 400 for eventual storage within data storage devices 206. I/O coordinator passes data to a mapping system 432. Mapping system 432 provides meta-data to the lower arm of C-clamp 400.

In the embodiment illustrated in FIG. 4, compression coordinator 428 takes incoming I/O from both the C-clamp 400 upper arm and from compression engine 406, establishes the internal data layout, and manages all sub-I/O necessary to complete a given incoming I/O request. In one embodiment, compression coordinator 428 will arrange data in a specialized layout to ensure the availability of a logical block address range for both compressed and uncompressed data for any given chunk. In one embodiment, compression engine 406 is a throttled, pause-able background service that uses a compression library to compress or decompress the data. In one embodiment, at initialization, compression engine 406 may start a number of work threads for performing the background compression, recompression, or decompression operations. When all work threads are active, subsequent compression operations will be queued within compression engine 406.

In one embodiment, compression engine 406 will interact with compression coordinator 428 to compress or decompress a chunk. Compression coordinator 428 will complete the request and provide notification of the status, such as: successful, out of space, out of other resources like chunk buffers, or I/O error. If chunk compression fails, compression engine 406 may simply proceed to the next chunk. If chunk decompression fails, compression engine 406 may stop decompression and log an error.

In one embodiment, compression engine 406 may monitor compression engine object 404, which may indicate that a TLU is subject to an initial compression, a recompression, a decompression, etc. . . . . . In one embodiment, initial compression applies to every chunk in the TLU. During a recompression, compression engine 406 may request a list of uncompressed extents from compression coordinator 428. In one embodiment, both initial compression and recompression will proceed in a forward fashion, updating a persistent status marker after a predetermined number of chunks have been processed. If a chunk behind the progress marker is decompressed to service a host write, then that chunk will remain decompressed until the next recompression pass.

During a compression, compression engine 406 may track the amount of space it has saved. In one embodiment, if compression engine 406 observes that it has recovered an entire slice worth of data, compression engine 406 may signal to MLU manager 408 that a slice evacuation is likely to be successful. An evacuated slice may be released and returned to the pool of slices for allocation to another logical unit if needed. Alternatively, compression engine 406 may notify MLU manager 408 any time the persistent progress marker is updated, and MLU manager 408 may determine whether evacuation is likely to succeed. Compression engine 406 may also signal for evacuation at the end of every compression pass in case the fractional savings are enough to free another slice. Mapping system 432 may coalesce evacuation requests and free as many slices as it discovers possible, which may be zero. Upon completing a compression pass, compression engine 406 may set the "last consumed capacity" in the corresponding MLU object 410.

In one embodiment, when work threads are idle, they may periodically scan for MLU objects 410 which have compression activated to see if any MLUs have increased utilization since the time of the MLU's last compression operation. If so, the thread may begin a recompression operation. For the purposes of checking if recompression is needed, compression engine 406 may use an interface of MS manager 412 to obtain the actual capacity consumed by mapping system 432. This provides an accurate picture of storage used that is not subject to the timing of the completion of slice evacuation requests.

In one embodiment, a user of data storage system 200 may set a value for compression and/or decompression rate, in order to control how fast the compression or decompression process operates or how many resources the process consumes.

Direct mapped logical units, especially those that are mapped to RAID arrays, such as Flare LUG (FLUs) cannot be compressed directly, because there is no way to release storage from the middle of a FLU and return it to that logical unit's RAID group. One approach is to overcome this limitation is to migrate the FLU to a thinly provisioned LU (TLU) and then compress it.

Figure 5A:
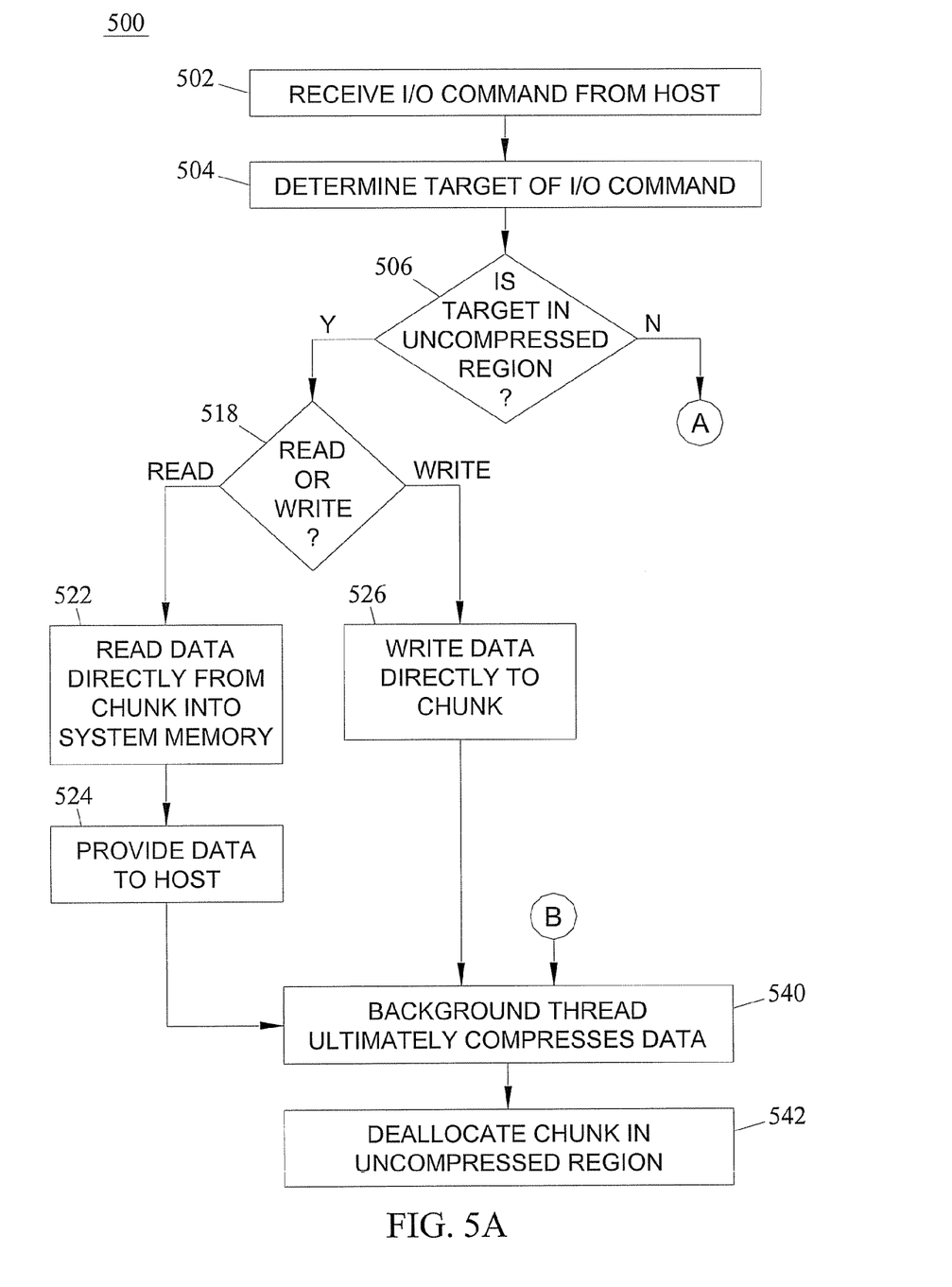
FIGS. 5A and 5B are a flow chart illustrating an exemplary process for compressing data received at a virtually provisioned storage entity according to an embodiment of the subject matter described herein.
Figure 5B:
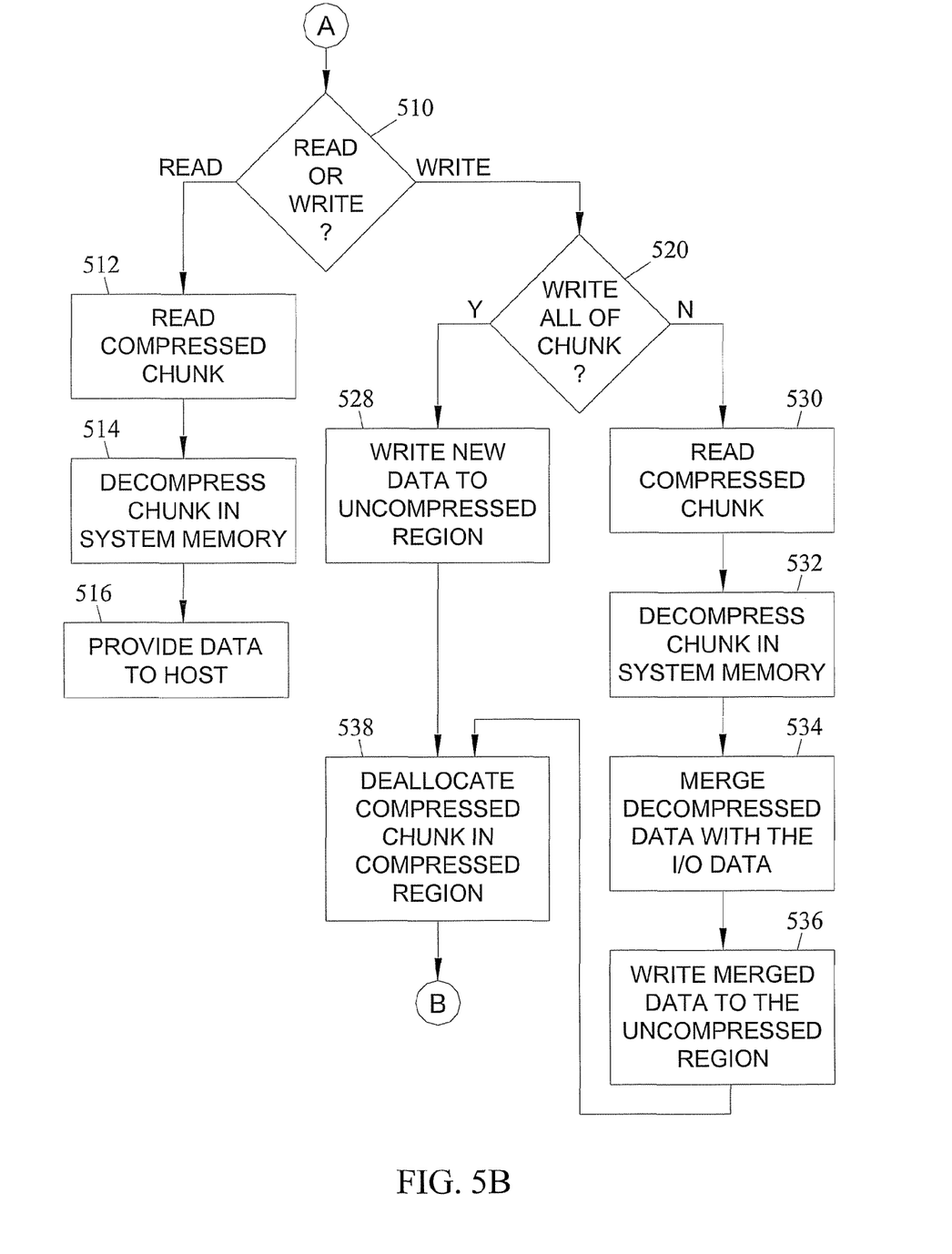

FIGS. 5A and 5B are a flow chart depicting an exemplary method 500 for accessing and compressing data incoming to a data storage entity according to an embodiment of the subject matter described herein. At block 502, a data storage system receives an I/O command. Example I/O commands include, but are not limited to, I/O read, in which data is read from the data storage entity, and I/O write, in which data is written to the data storage entity. For example, referring to FIG. 2, controller 202 may receive an I/O command from host 204 that requests a read or write operation to be performed at a particular address in the logical block address space. If an I/O command is received, the process flow moves to block 504.

At block 504, the target of the I/O command is determined. In one embodiment, compression coordinator 428 is configured to locate appropriate target chunks and logical blocks based on the received I/O commands. For example, for I/O commands that are directed to a logical block, the location of the logical block is identified by compression coordinator 428. Each logical block is within a chunk, and thus the identity of the target chunk is determined. For example, host 204 may issue an I/O write to logical block address X (LBA X) of MLU1 210. As shown in FIG. 2, LBA X is located within mapping allocation unit C, and as shown in FIG. 3, LBA X is located within chunk C2. For the purpose of illustration, it is presumed for this example that the logical unit is fully compressed, i.e., it is in the state shown in element 302 of FIG. 3. At block 506, it is determined whether the target resides in the uncompressed region of the expanded logical block address space. For example, compression coordinator 428 first determines if there is a valid mapping between the LBA specified in the received I/O command and corresponding logical block in the uncompressed region. In one embodiment, a mapping is between the LBA and some storage extent in the pool, describing where data (if any) can be found in physical terms. For example, a typical mapping may either be none (meaning no data for that LBA) or LUN 0 LBA 0, length 128 blocks mapping to pool LUN 9001, LBA 1024, length 128 blocks, where pool LUN 9001 is one of the LUNG created internally by the pool manager on the drives that were assigned to the storage pool.

If a valid mapping does not exist, then compression coordinator 428 determines if there is a valid mapping between the LBA plus the offset (e.g., $A_{MAX}/2$) and the corresponding logical block in the compressed region. Thus, if the compression coordinator 428 determines that the target chunk is in the compressed region, then method 500 proceeds to block 510. Alternatively, if it is determined that the target resides in the uncompressed region, then method 500 continues to block 518.

At block 510, it is determined whether the I/O command is a read or a write. If the I/O command is a write, method 500 moves to block 520, where it is determined whether the write operation will write data to just a portion of the target chunk or completely overwrite the entire chunk. If the I/O command requests a read operation, then method 500 continues to block 512.

At block 512, the target chunk in the compressed region is read. For example, compression coordinator 428 reads the chunk from a storage disk by locating the proper target chunk in the LBA space using the LBA address (provided by the I/O command) along with the $A_{MAX}/2$ offset. In one embodiment, the compressed data that is read is placed in a first buffer (e.g., RAM) located in system memory.

At block 514, the target chunk is decompressed. In one embodiment, compression coordinator 428 decompresses the compressed target chunk data located in the aforementioned buffer using a compression algorithm and places the resulting decompressed data in a second buffer in system memory.

At block 516, the requested data is provided to the host. In one embodiment, compression coordinator 428 obtains the portion of the data from the decompressed data using the LBA. For example, compression coordinator 428 places the portion of data requested by the host in a third buffer, and the data is transmitted from the buffer to host 204. In one embodiment, the third buffer is initially established by controller 202 upon receiving the original I/O command from the host.

Returning back to decision block 510, method 500 continues to block 520 where a determination is made as to whether the write operation will either write data to a portion of the target chunk or completely overwrite the entire chunk. If the system determines that the target chunk is to be completely overwritten, then method 500 proceeds to step 528 where the new write data from the host is written to the LBA (e.g., LBA X) in the uncompressed region that corresponds to the LBA of the compressed data (e.g., LBA $X+A_{MAX}/2$) as an uncompressed chunk. Method 500 then continues to block 538.

At block 538, the compressed chunk in the compressed region is deallocated. In one embodiment, compression coordinator 428 determines that the compressed chunk in the compressed region of the LBA is now redundant and deallocates the chunk.

Returning back to decision block 520, after determining that the entire compressed chunk will not be overwritten, method 500 continues to block 530 where the compressed chunk is read. For example, compression coordinator 428 reads the chunk from a disk by locating the proper target chunk in the LBA space using the LBA address (provided by the I/O command) along with the $A_{MAX}/2$ offset. In one embodiment, the compressed data that is read is placed in a first buffer (e.g., RAM) located in system memory.

At block 532, the target chunk is decompressed. In one embodiment, compression coordinator 428 decompresses the compressed target chunk data located in the aforementioned buffer using a compression algorithm and places the resulting decompressed data in a second buffer in system memory.

At block 534, the decompressed data is merged with the I/O data. In one embodiment, compression coordinator 428 merges the data to be written (i.e., specified in the I/O message) with the decompressed data in the system memory by either overwriting a section of old data specified by the host or inserting new data at a particular LBA indicated by the host.

At block 536, the merged data is written to the uncompressed region. In one embodiment, compression coordinator 428 writes the merged data in the system memory to the LBA (e.g., LBA X) in uncompressed region that corresponds to the LBA of the location of the compressed data (e.g., LBA $X+A_{MAX}/2$) as an uncompressed chunk. As one example, the execution of blocks 532-536 of method 500 may be illustrated by the decompression of chunk C2' in stage 302 and the writing of chunk C2 in stage 304 of FIG. 3.

After the merged data is written to the uncompressed region, method 500 continues to block 538 where compression coordinator 428 determines that the corresponding compressed chunk in the compressed region of the LBA is now redundant and deallocates the compressed chunk.

Returning back to decision block 506, after determining that the target chunk is located in the uncompressed region, method 500 continues to block 518 where a determination is made as to whether the I/O command is a read or a write. If the I/O command is a write, method 500 moves to block 526. If the I/O command requests a write operation, then method 500 continues to block 526 where the data is written by compression coordinator 428 directly to the target chunk in the uncompressed region. If the I/O command requests a read operation, then method 500 proceeds to block 522 and data is read directly from the target chunk into system memory. In one embodiment, the data to be read is accessed and placed in a buffer by compression coordinator 428. In one embodiment, this buffer is initially established in system memory upon receiving the original I/O command from host 204.

At block 524, the data is provided to the host. In one embodiment, the aforementioned data in the buffer is prepared for transmission and is sent to the requesting host 204.

In block 540, the data in the target chunk is compressed. In one embodiment, compression engine 406 may utilize a background thread or program to recompress data located in the uncompressed region. Depending on how compression engine 406 is configured, the compression of a chunk in the uncompressed region may occur on a periodic basis, after every I/O command, or after a trigger condition occurs (e.g., a predefined threshold condition occurs).

In block 542, the chunk of uncompressed data is deallocated. In one embodiment, compression engine 406 deallocates the old uncompressed data associated with the chunk in the uncompressed region. This process allows the data storage system to free redundant data after the most current version of data is compressed and stored.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for accessing and compressing data in a data storage entity, the method comprising:
   receiving, at a data storage entity, an input/output (I/O) command to perform an operation on data associated with a logical block address (LBA) in a virtually provisioned device in the data storage entity, wherein the data storage entity has established an expanded private LBA space for the virtually provisioned device in the data storage entity to include both a compressed LBA space portion for storing compressed data and an associated uncompressed LBA space portion for storing uncompressed data;
   determining if a data chunk containing the data in the uncompressed LBA space is available using the LBA in the I/O command to access the data chunk;
   if the data chunk in the uncompressed LBA space is available, performing the operation on the data chunk; and
   if the data chunk in the uncompressed LBA space is not available, accessing the data chunk in the compressed LBA space using both the LBA and a predefined offset value and performing the operation on the data chunk.

2. The method of claim 1 wherein accessing the data chunk in the compressed LBA space includes determining whether the I/O command is either a read operation or a write operation.

3. The method of claim 2 wherein, if the I/O command is determined to be a read operation, reading the compressed chunk to memory of the data storage entity, decompressing the chunk in memory, and returning the requested portion of the decompressed data to the host.

4. The method of claim 2 wherein, if the I/O command is determined to be a write operation, determining whether the entire chunk is to be overwritten.

5. The method of claim 4 wherein, if the entire chunk is to be overwritten, writing data contained in the I/O command to the uncompressed LBA associated with the compressed LBA corresponding to the entire chunk, and deallocating the entire chunk in the compressed LBA space.

6. The method of claim 4 wherein, if the entire chunk is not to be overwritten, reading the compressed chunk to memory of the data storage entity, decompressing the chunk in the memory, merging the decompressed data in the chunk with write data contained in the I/O command, writing the merged data to the uncompressed LBA associated with the compressed LBA corresponding to the entire chunk, and deallocating the entire chunk in the compressed LBA space.

7. The method of claim 1 wherein the predefined offset value is equal to half of the maximum size of the expanded LBA space.

8. The method of claim 1 wherein determining if the data chunk in the uncompressed LBA space is available includes determining if a valid mapping associated with the LBA in the uncompressed LBA space exists.

9. A system for accessing and compressing data in a data storage entity, the system comprising:
   a compression coordinator, implemented by a processor, for receiving an input/output (I/O) command to perform an operation on data associated with a logical block address (LBA) in a virtually provisioned device in a data storage entity, wherein the data storage entity has established an expanded private LBA space for the virtually provisioned device in the data storage entity to include both a compressed LBA space portion for storing compressed data and an associated uncompressed LBA space portion for storing uncompressed data; and
   a compression engine for executing background operations that send commands to the compression coordinator that instruct the compression coordinator to compress or decompress chunks of data in the expanded private LBA space, wherein the compression coordinator is further configured to determine if a data chunk containing the data in the uncompressed LBA space is available using the LBA in the I/O command to access the data chunk, to perform the operation on the data chunk if the data chunk in the uncompressed LBA space is available, and if the data chunk in the uncompressed LBA space is not available, to access the data chunk in the compressed LBA space using both the LBA and a predefined offset value, decompress that data, and to perform the I/O command on or with the decompressed data for the data chunk.

10. The system of claim 9 wherein the background operations executed by the compression engine have the effect of compressing, recompressing, or decompressing at least a portion of the virtually provisioned device.

11. The system of claim 10 wherein the predefined offset value is equal to half of the maximum size of the expanded LBA space.

12. The system of claim 9 wherein the compression engine is further configured to determine when the background compression, recompression, or decompression operations are to be executed.

13. The system of claim 9 wherein the compression coordinator is further configured to determine whether the I/O command is either a read operation or a write operation.

14. The system of claim 13 wherein the compression coordinator is further configured to, if the I/O command is determined to be a read operation, read the compressed chunk to memory of the data storage entity and decompress the chunk in the memory.

15. The system of claim 13 wherein the compression coordinator is further configured to, if the I/O command is determined to be a write operation, determine whether the entire chunk is to be overwritten.

16. The system of claim 15 wherein the compression coordinator is further configured to, if the entire chunk is to be overwritten, write data contained in the I/O command to the uncompressed LBA associated with the compressed LBA corresponding to the entire chunk, and deallocate the entire chunk in the compressed LBA space.

17. The system of claim 15 wherein the compression coordinator is further configured to, if the entire chunk is not to be overwritten, read the compressed chunk to memory of the data storage entity, decompress the chunk in the memory, merge the decompressed data in the chunk with write data contained in the I/O command, write the merged data to the uncompressed LBA associated with the compressed LBA corresponding to the entire chunk, and deallocate the entire chunk in the compressed LBA space.

18. The system of claim 9 wherein the compression coordinator is further configured to determine if a valid mapping associated with the LBA in the uncompressed LBA space exists.

19. A non-transitory computer readable medium having stored thereon executable instructions that when executed by the processor of a computer control the computer to perform steps comprising:

at a data storage entity:
receiving an input/output (I/O) command to perform an operation on data associated with a logical block address (LBA) in a virtually provisioned device in the data storage entity, wherein the data storage entity has established an expanded private LBA space for the virtually provisioned device in the data storage entity to include both a compressed LBA space portion for storing compressed data and an associated uncompressed LBA space portion for storing uncompressed data;

determining if a data chunk containing the data in the uncompressed LBA space is available using the LBA in the I/O command to access the data chunk;

if the data chunk in the uncompressed LBA space is available, performing the operation on the data chunk; and if the data chunk in the uncompressed LBA space is not available, accessing the data chunk in the compressed LBA space using both the LBA and a predefined offset value and performing the operation on the data chunk.

20. The computer readable medium of claim 19 wherein accessing the data chunk in the compressed LBA space includes determining whether the I/O command is either a read operation or a write operation.

21. The computer readable medium of claim 20 wherein, if the I/O command is determined to be a read operation, reading the compressed chunk to memory of the data storage entity, decompressing the chunk in the memory, and returning the requested portion of the decompressed data to the host.

22. The computer readable medium of claim 20 wherein, if the I/O command is determined to be a write operation, determining whether the entire chunk is to be overwritten.

23. The computer readable medium of claim 22 wherein, if the entire chunk is to be overwritten, writing data contained in the I/O command to the uncompressed LBA associated with the compressed LBA corresponding to the entire chunk, and deallocating the entire chunk in the compressed LBA space.

24. The computer readable medium of claim 22 wherein, if the entire chunk is not to be overwritten, reading the compressed chunk to memory of the data storage entity, decompressing the chunk in the memory, merging the decompressed data in the chunk with write data contained in the I/O command, writing the merged data to the uncompressed LBA associated with the compressed LBA corresponding to the entire chunk, and deallocating the entire chunk in the compressed LBA space.

* * * * *